United States Patent [19]
Cochrane

[11] 3,905,656
[45] Sept. 16, 1975

[54] MASTER CYLINDER ASSEMBLIES FOR HYDRAULIC SYSTEMS

[75] Inventor: Robin Adam Cochrane, Haseley Knob, England

[73] Assignee: Girling Limited, Birmingham, England

[22] Filed: Aug. 10, 1973

[21] Appl. No.: 387,257

Related U.S. Application Data

[62] Division of Ser. No. 215,848, Jan. 6, 1972, abandoned.

[52] U.S. Cl. ................................. 303/50; 60/568
[51] Int. Cl. ............................................ B60t 15/04
[58] Field of Search ........ 60/568, 570, 594; 303/50, 303/57

[56] References Cited
UNITED STATES PATENTS

| | | | |
|---|---|---|---|
| 2,484,628 | 10/1949 | Valley | 303/50 |
| 3,026,908 | 3/1962 | Blair | 303/50 |
| 3,237,411 | 3/1966 | Taft | 60/566 |
| 3,703,079 | 11/1972 | Ingram | 60/562 |

FOREIGN PATENTS OR APPLICATIONS

| | | | |
|---|---|---|---|
| 1,069,538 | 11/1959 | Germany | 60/594 |

*Primary Examiner*—Martin P. Schwadron
*Assistant Examiner*—H. Burks, Sr.
*Attorney, Agent, or Firm*—Scrivener Parker Scrivener and Clarke

[57] ABSTRACT

In a master cylinder assembly a piston assembly working in a bore operates a normally closed valve controlling communication between an inlet and an outlet. A normally open port is adapted to be closed by an axially movable valve member resilient connected to the piston assembly before the normally closed valve is opened.

3 Claims, 15 Drawing Figures

MASTER CYLINDER ASSEMBLIES FOR HYDRAULIC SYSTEMS

This a division of application Ser. No. 215,848 filed Jan. 6, 1972, now abandoned.

SPECIFIC DESCRIPTION

This invention relates to master cylinder assemblies for hydraulic systems of the kind comprising a housing having a cylindrical bore in which works a piston for operating a normally closed valve controlling communication between an inlet for connection to a source of high pressure fluid, for example an hydraulic accumulator or pump, and an outlet for connection to a slave cylinder for actuating a brake or a clutch and in a normal inoperative position the valve is closed and the outlet is in communication with a port for connection to a reservoir for supplying fluid to the source of high pressure fluid.

According to our invention in a master cylinder of the kind set forth communication between the outlet and the port is controlled by an axially movable valve member engageable with a seating surrounding the port, and the valve member is resiliently connected to the piston assembly in such a manner that when the piston assembly is advanced in the bore the valve member engages with the seating to cut-off communication between the outlet and the port before the piston assembly opens the normally closed valve.

Conveniently the normally closed valve comprises a spring-loaded tilting valve.

The piston assembly is normally held in a retracted position in which the tilting valve is closed by a first return spring, and a stop member associated with the piston engages with an enlarged head on the end of the valve member remote from the seating to hold the axially movable valve member in a position spaced from the seating to permit connection between the outlet and the port.

In one construction the first return spring engages at opposite ends between a pair of axially spaced spring retaining plates which are located in the bore and which abut respectively against the piston assembly and a wall at a closed end of the bore remote from the piston assembly, and the retaining plates are provided with complementary axially aligned openings through which the valve member is slidably guided for movement towards and away from its seating, the retaining plate abutting against the piston forming the stop member with which the enlarged head is adapted to engage, and a second return spring of a strength less than that of the first return spring acting between the piston and the enlarged head to urge the head towards the stop member.

In a modification the second return spring is omitted and the end of the valve member for engagement with the seating is formed as an enlarged head engageable with the spring retaining plate which abuts against the end wall to form a stop defining the retracted position of the piston assembly.

Some embodiments of our invention are illustrated in the accompanying drawings in which.

Figure 1:
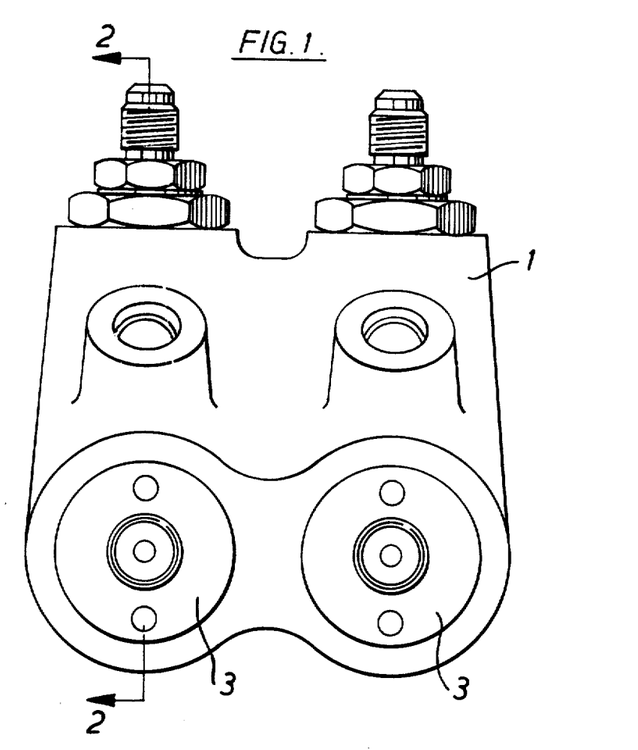
FIG. 1 is an end elevation of a dual master cylinder assembly.
Figure 2:
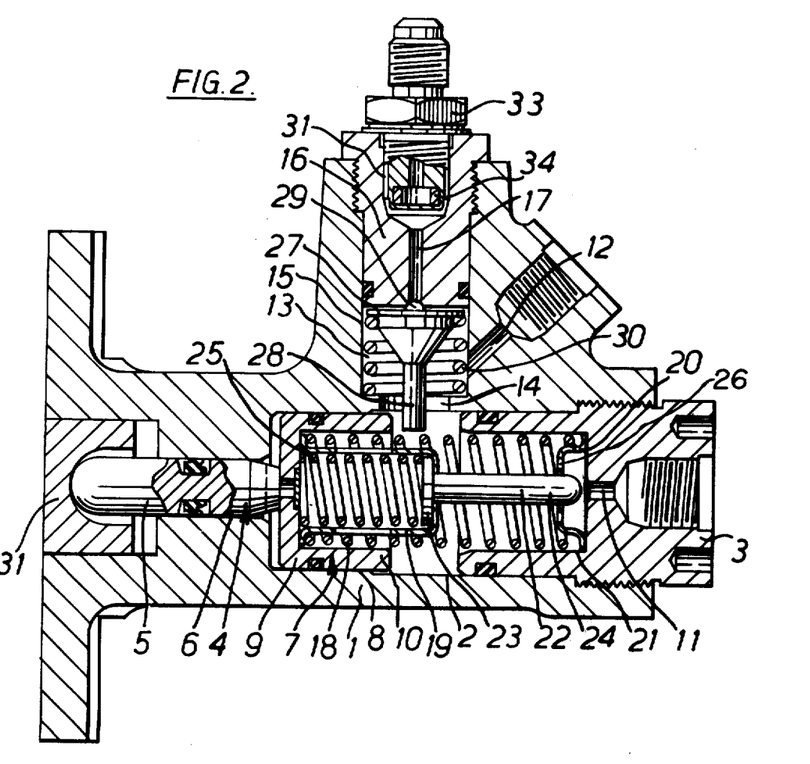
FIG. 2 is a longitudinal section on the line 2—2 of FIG. 1.

The dual master cylinder assembly illustrated in FIGS. 1 and 2 of the drawings comprises a housing 1 in which a pair of master cylinders are incorporated. Since the master cylinders are identical in construction and operation, only one will be described with reference to FIG. 2 of the drawings. The housing 1 is provided with two parallel axially extending stepped bores 2, each closed at its open innermost end by a plug 3 screwed into the bore at the end.

A two part differential piston assembly 4 works in the stepped bore 2 and comprises a piston part 5 working in the portion 6 of the bore of smaller diameter and a piston part 7 working in the portion 8 of the bore of greater diameter. The piston part 7 comprises an annular flange 9 having annular skirt 10 which extends axially and forwardly towards the plug 3.

The portion of the stepped bore 2 in front of the piston part 7 comprises a pressure space which is normally in connection with a reservoir for hydraulic fluid through an axial port 11 in the plug 3.

The pressure space is also in communication with an outlet passage 12 in the wall of the housing 1 for connection to a slave cylinder for actuating a wheel brake of a vehicle or a clutch. The outlet passage 12 leads into a chamber 13 in the wall and a port 14 in the wall provides communication between the chamber 13 and the pressure space. The chamber 13 is defined within a radial bore 15 between the portion of the wall of the housing 1 which surrounds the port 14 and the inner end of a plug 16 which is screwed into the outer end of the bore 15. The plug 16 is formed with an axial passage 17 providing communication between the chamber 13 and a source of hydraulic fluid under pressure, for example a high pressure pump supplied with fluid from the reservoir or an hydraulic accumulator supplied by the pump.

In the inoperative position illustrated in the drawings the piston assembly 4 is held in a retracted position by means of a helical return spring 18 which abuts at opposite ends against a pair of spring retaining plates 19 and 20. The retaining plates 19, 20 are of circular dished outline formed with opposed radial flanges which abut respectively against the flange 9 of the piston part 7 which is surrounded by the skirt 10 and the base of a recess 21 in the inner end of the plug 3 by the action of the return spring 21 acting thereon. The diameters of the flanges of the retaining plates 19, 20 are slightly smaller than the internal diameters of the skirt 10 and the recess 18 so that the plates 19 and 20 are located against movements in radial directions. The plate 19 which is of substantial axial length, being generally of top-hat outline, provides a guide for a valve member 22 comprising a head 23 working within the plate 19 carrying an axial extending stem 24 which projects from the plate 19 through a central opening in its innermost end. The stem 24 also extends through a complementaty opening in the plate 20 which is coaxial with the opening in the plate 19. Normally the head is held in engagement with the inner end of the plate 19 by the action of a helical spring 25 acting between the head 23 and the flange 9 of the piston assembly 4. In that position the free end of the stem 24 is spaced from a seating surrounding the port 11 with which it is aligned axially. Thus the outlet passage 12 and the port 11 are in free communication through the port 14 and the pressure space, and a plurality of openings 26 located in the plate 20 on a pitch circle of constant diameter.

Normally communication between the passage 17 in the plug 16 and the chamber 13 is cut off by the provision of a tilting valve housed within the chamber 13. The tilting valve comprises a head 27 carried by a stem 28 which extends in the bore 2 and into path of the free end of the skirt 10 through the port 14. The head 27 is formed with a central domed portion 29 which is normally urged into engagement with a seating surrounding the inner end of the passage 17 in the plug 16 by the action of a spring 30 acting between the head 27 and the wall of the housing which surrounds the port 4.

In the inoperative position shown in the drawings the stem 28 is spaced from the free end of the skirt 10 by a distance slightly greater than that by which the free end of the stem 24 is spaced from the seating in the plug 3.

The piston assemblies 4 of the dual master cylinder assembly are adapted to be advanced simultaneously by the provision of a transverse balance bar 31 to which a force can be applied at an intermediate point in its length from a foot pedal. The balance bar 31 acts on the outer end of the piston part 5.

When the foot pedal is depressed to advance the piston assemblies in their bore the return springs 18 are compressed and the stems 24 engage with the seatings surrounding the parts 11 to cut-off communication between the pressure spaces and the reservoir. A further additional movement of the piston assemblies 4 in the same direction causes the skirt 10 to engage with the stem 28 of the tilting valve which tilts about the engagement between the spring 30 to allow high pressure fluid to enter the chamber through the passage 17. Thereafter fluid under pressure is supplied to the slave cylinder through the outlet 12.

During the additional movement of the piston assemblies 4 the return springs 18 are compressed by a further amount, and the springs 25 are compressed to permit the spring retaining plates 19 to be advanced in the bores with the piston assemblies.

When the pedal is released, the tilting valve closes to cut-off communication with the high pressure source. Thereafter the stem 24 is retracted from its engagement with the seating in the plug 3 so that fluid can return to the reservoir from the slave cylinders.

In the embodiment described above the provision of the retaining plates 19 and 20 ensures that the valve member 22 is supported adequately and is guided in an axial direction towards and away from the seating surrounding the port 11.

As illustrated in FIG. 2 the plug 16 may be counterbored at its outer end at 32 to receive a union 33 for connection to the source of high pressure fluid. Conveniently the union 33 may embody a filter 34.

Figure 3:
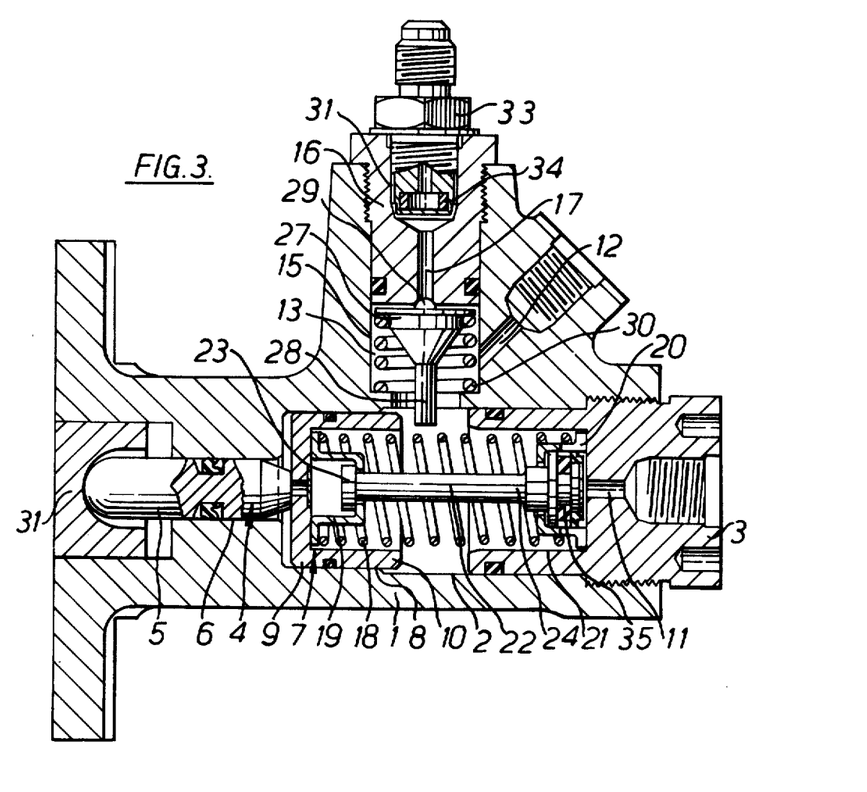
FIG. 3 is a longitudinal section similar to FIG. 2 but showing a modification.

In the embodiment of FIG. 3 the spring 25 is omitted and the stem 24 at its free end carries an enlarged valve head 35 for engagement with the seating surrounding the port 11 in the plug 3. The spring retaining plate 20 is of generally top-hat section and, in the inoperative position shown, the valve head 35 and the head 23 engage with the retainer plates 20 and 19 respectively to define the retracted position of the piston assembly 4 under the influence of the return spring 18.

The construction and operation of the embodiment illustrated in FIG. 3 is otherwise the same as that described above with reference to FIG. 2 corresponding reference numerals have been applied to corresponding parts.

In the embodiments described above and illustrated in FIGS. 1 and 2, and in FIG. 3 of the drawings the piston assembly is of separable two-part construction. The pressure within the bore in which the piston assembly works acts on opposite faces of different areas of the part of the piston which is a greater diameter due to the pressure acting on an area equal to that of the seating with which the axially movable valve member is engageable. This results in a resultant force being applied to the part of the piston or greater diameter in a direction which tends to move it relatively away from the part of the piston of smaller diameter. When the brake is released the piston assembly is restored to a retracted position under the influence of a return spring. The tendency for the part of the portion of greater diameter to move away from the part of smaller diameter tends to delay movement of the axially movable valve member away from the seating surrounding the port with the result that there may be a delay in relieving the braking pressure. The difficulty is substantially eliminated by ensuring that the return spring is sufficiently strong to resist any tendency for the parts of the piston assembly to separate when the brake is released.

Figure 4:
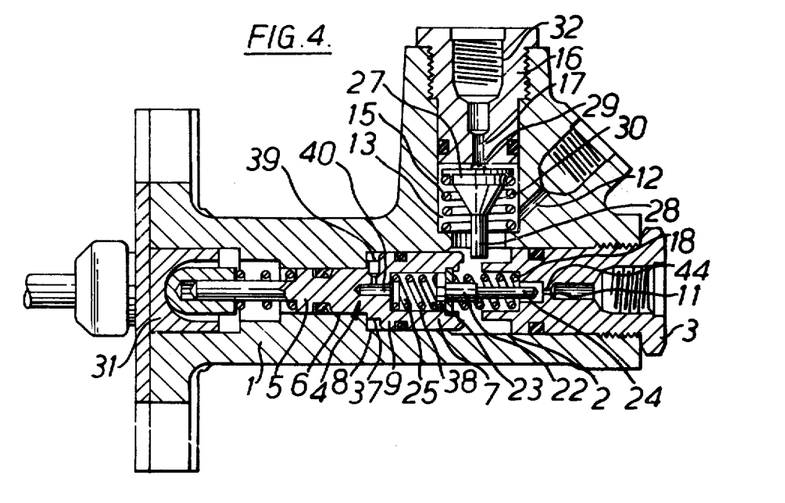
FIG. 4 is a longitudinal section through a modified dual master cylinder.

In the master cylinder assembly illustrated in FIG. 4 of the drawings the differential piston assembly 4 is of one-piece construction and the piston part 7 of greater diameter is separated from the piston part 5 by an annulus 37 of an external diameter intermediate those of the pistons parts 5 and 7. The piston part 7 is provided with an axial bore 38 which communicates with the portion 8 of the stepped bore 2 between a shoulder 39 at the step in diameter and the piston part 7 of greater diameter through communicating axial and radial passages 40 and 41 respectively.

The head 23 of the valve member 22 works in the bore 38 and is normally urged into engagement with a readial abutment stop 42 at the outer end of the piston part 7 by a helical spring 43. The return spring 18, which is relatively weak, acts bwtween the abutment stop 42 and the inner end of the plug 3 in which the port 11 is located.

The free end of the valve stem 24 is of pointed outline for engagement with a seating surrounding a restricted port 44 at the inner end of the passage 11.

When the piston assembly 4, or each piston assembly 4 in the case of the dual master cylinder illustrated, is advanced in the bore 2 the return spring 18 is compresaed and the valve stem 24 engages with the seating surrounding the port 44 to cut-off communication between the pressure space and the reservoir. An additional movement of the piston assembly 4 in the same direction opens the tilting valve so that high pressure fluid is supplied to the slave cylinder of the brake through the outlet 12.

During that additional movement the return spring 11 is compressed by a further amount, and the spring 43 is compressed when the piston assembly 4 is advanced relative to the valve member 22.

As described above the pressure within the bore 2 acts on opposite faces of the end wall 9 of the piston part 7 to apply to the piston assembly 4 a force opposing the brake applying effort from the pedal. When the pedal is released, that force is effective to retract the piston assembly 4 initially and enable the tilting valve to close under the influence of the spring 30. Thereafter the valve stem 24 is automatically withdrawn from its engagement with the seating surrounding the restricted port 44 and allow pressure fluid within the bore 2 to return to the reservoir thereby relieving the braking pressure. The return spring 18 is then operative to return the piston assembly 4 to its operative retracted position in which the annulus engages with the shoulder 39.

The construction and operation of the embodiment of FIG. 4 is otherwise the same as the embodiments described above and corresponding reference numerals have been applied to corresponding parts.

Figure 5:
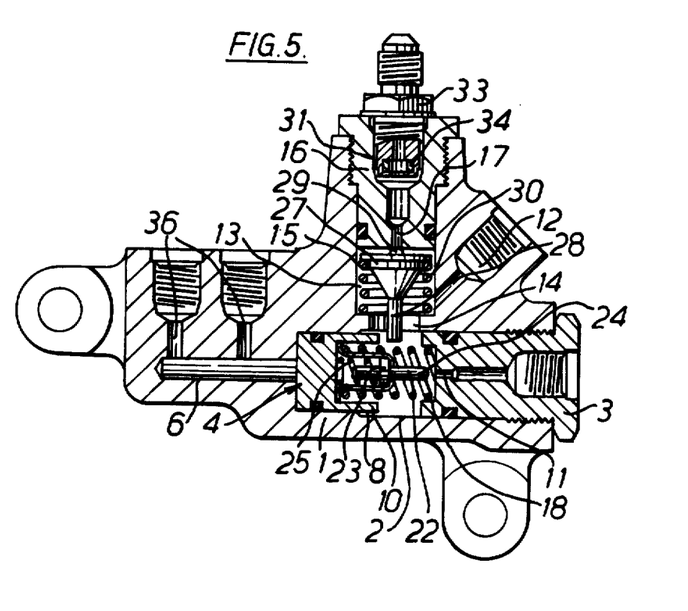
FIG. 5 is a longitudinal section through a further master cylinder.

The master cylinder assembly illustrated in FIG. 5 comprises a single master cylinder. In that construction the balance bar 31 and the piston part 5 have been omitted. To advance the piston assembly, comprising the piston part 4, in the bore 8, fluid under pressure, from a fluid pressure source for example a master cylinder, is applied directly to the piston part 4 through at least one radial port 36 in the housing 1 which communicates with the portion 6 of the stepped bore 2 which is of smaller diameter.

The construction and operation of the embodiment of FIG. 5 is otherwise the same as that described above with reference to FIG. 2 and corresponding reference numerals have again been applied to corresponding parts.

Figure 6:
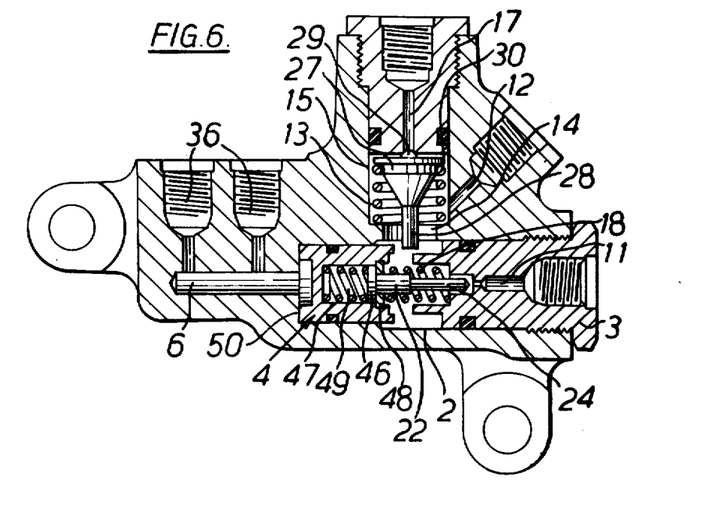
FIG. 6 is a longitudinal section similar to FIG. 5 but showing a modification.

In the master cylinder illustrated in FIG. 6 the axially movable valve member 22 comprises a head 46 working in a longitudinal bore 47 in the piston 4 and located at the end of the member 22 remote from the axially extending stem 24. Normally the head 46 is urged into engagement with a radial stop abutment 48 at the inner end of the piston 4 by means of a helical spring 49. The stem 24 projects through the stop abutment 48 and is pointed at its free end for engagement with the seating surrounding the inner end of the axial passage 11 in the plug 3.

In the inoperative position shown in the drawing the piston 4 is held against a stop defined by a shoulder 50 at the inner end of the bore 2 by means of the return spring 18 which acts between the stop abutment 48 and the inner end of the plug 3. In that position the free end of the piston 4 is spaced from the stem 28 of the tilting valve so that that valve is normally closed, and the pointed end of the valve stem 24 is spaced from the seating to place the pressure space 2 in free communication with the reservoir for the source of high pressure fluid through the passage 11.

When the piston 4 is subjected to a supply of hydraulic fluid under pressure through one of the radial ports 36 and the bore portion 6, the piston 4 is advanced in the bore 2. Initial movement of the piston 4 in that direction causes the valve member 22 to engage with its seating to cut-off communication between the pressure space 2 and the reservoir. Thereafter, further movement of the piston 4 in the same direction causes the free end of the piston 4 to engage with the stem 28 of the tilting valve with the result that the tilting valve is opened and hydraulic fluid under pressure is supplied to the slave cylinder through the inclined outlet passage 12.

When the pressure applied to the piston 4 is relieved, the pressure within the pressure space acts on the piston 4 to augment the effect of the return spring 18 and cause the piston 4 to move into its retracted position in which it engages with the shoulder 50. During this movement the radial stop abutment 48 engages with the head 46 to withdraw the valve member 22 from its engagement with the seating. Thus retraction of the valve 22 is effected simultaneously with retraction of the piston 4 at least through a part of the retraction movement of the piston 4.

The construction and operation of the embodiment of FIG. 6 is otherwise the same as that of FIG. 5, and corresponding reference numerals have been applied to corresponding parts.

Figure 7:
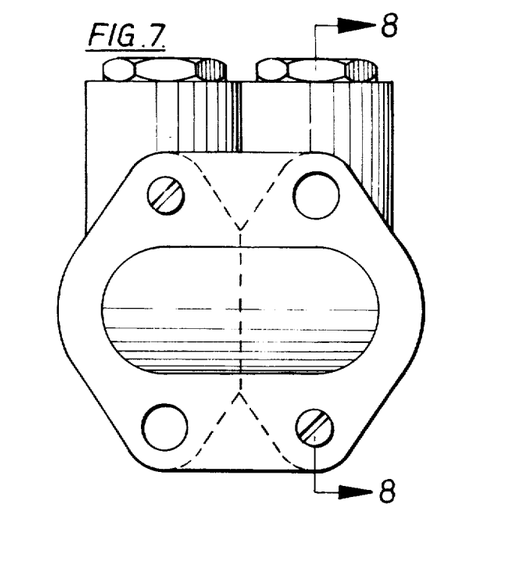
FIG. 7 is an end view of a modified dual master cylinder.
Figure 8:
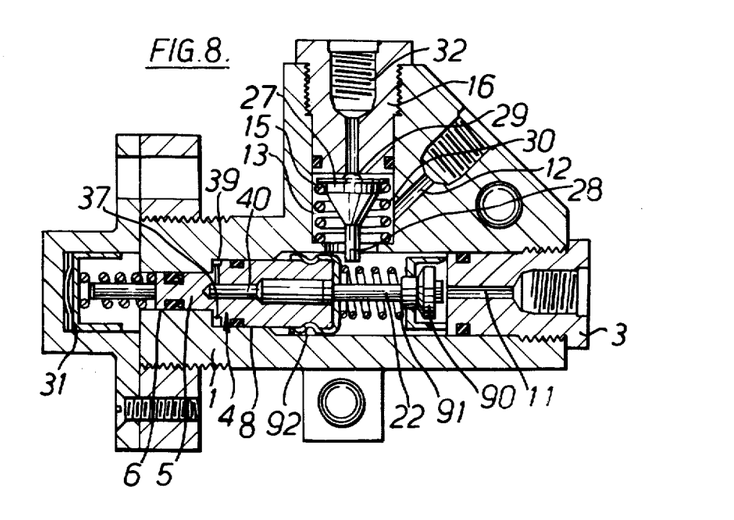
FIG. 8 is a longitudinal section on the line 8—8 of FIG. 7.

The dual master cylinder illustrated in FIGS. 7 and 8 is similar to the construction illlustrated in FIG. 4.

The valve member 22 carries an enlarged head 90 for engagement with a seating surrounding the inlet passage 11 in the plug 3. The return springs 25 and 18 are replaced by a single return spring 91 acting between the head 90 and flanged cap 92 which is placed over the inner end of the piston 4 and acts a stop for the enlarged head 23 on the inner end of the valve member 22.

The construction and operation of the embodiment of FIGS. 7 and 8 is otherwise the same as that of FIG. 4, and corresponding reference numerals have been applied to corresponding parts.

Figure 9:
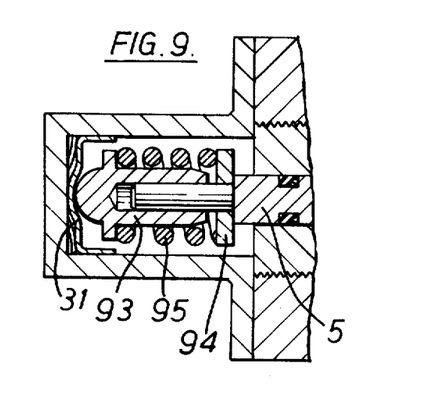
FIG. 9 is a longitudinal section of a part of FIG. 8 showing a modification.

The balance bar 31 may act directly on the outer end of the piston 4. However, as illustrated in FIG. 9, the balance bar 31 acts on the piston through a lost motion connection comprising a sleeve 93 which is normally spaced at its inner end from a thrust collar 94 by means of a spring 95.

The provision of the lost motion connection facilitates operation of the balance bar 31 to compensate for differential wear of the function linings.

Figure 10:
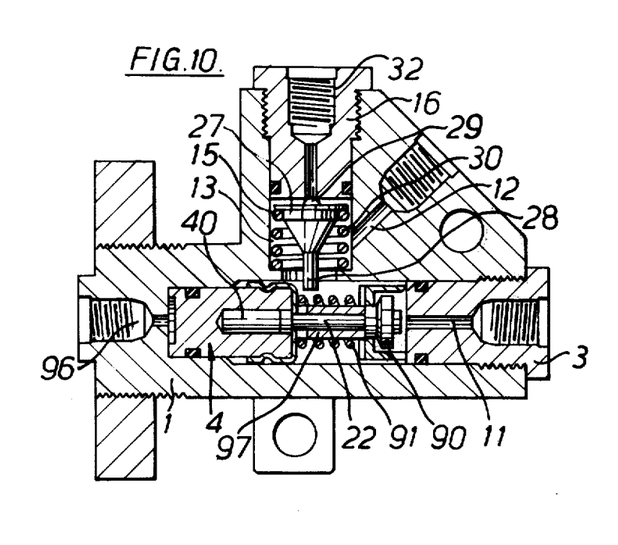
FIG. 10 is a further view similar to FIG. 8 but showing a further modified form of master cylinder.

In the embodiment of FIG. 10 the balance bar 31 and the piston part 5 have been omitted. To advance the pistion assembly 4 in the bore 8, fluid under pressure is applied directly to the piston part 4 through an axial port 96 in the end of the housing 1 remote from the plug 3.

A spacer sleeve 97 surrounds the valve stem 22 and forms a radical location for the spring 91. The sleeve is of an axial length less than the effective distance between the head 90 and the piston 4 when the master cylinder is in the position shown in the drawings.

The construction and operation of the embodiment of FIG. 10 is otherwise the same as that of FIG. 8 and 9 corresponding reference numerals have been applied to corresponding parts.

In the manually-operable brake applying mechanism illustrated in FIGS. 11–14 of the drawings 101 is a housing provided with a stepped bore 102 in which works a differential piston 103. The portion of the bore 103 which is of greater diameter is counterbored at 104 for a substantial part of its axial length and the open end of the counterbore 104 is closed by a plug 105 provided with an axial exhaust port 106 for connection to a reservoir for hydraulic fluid. The portion of the counterbore 104 into which the piston 103 projects defines a pressure space 107. The piston 103 is bored axially at 108 from its innermost end, and the bore 108 communicates with a radial passage 109 so that the pressures acting on the end of the piston which is of greater diameter and on a shoulder 110 at a step in the change in diameter, are equalised.

Figure 11:
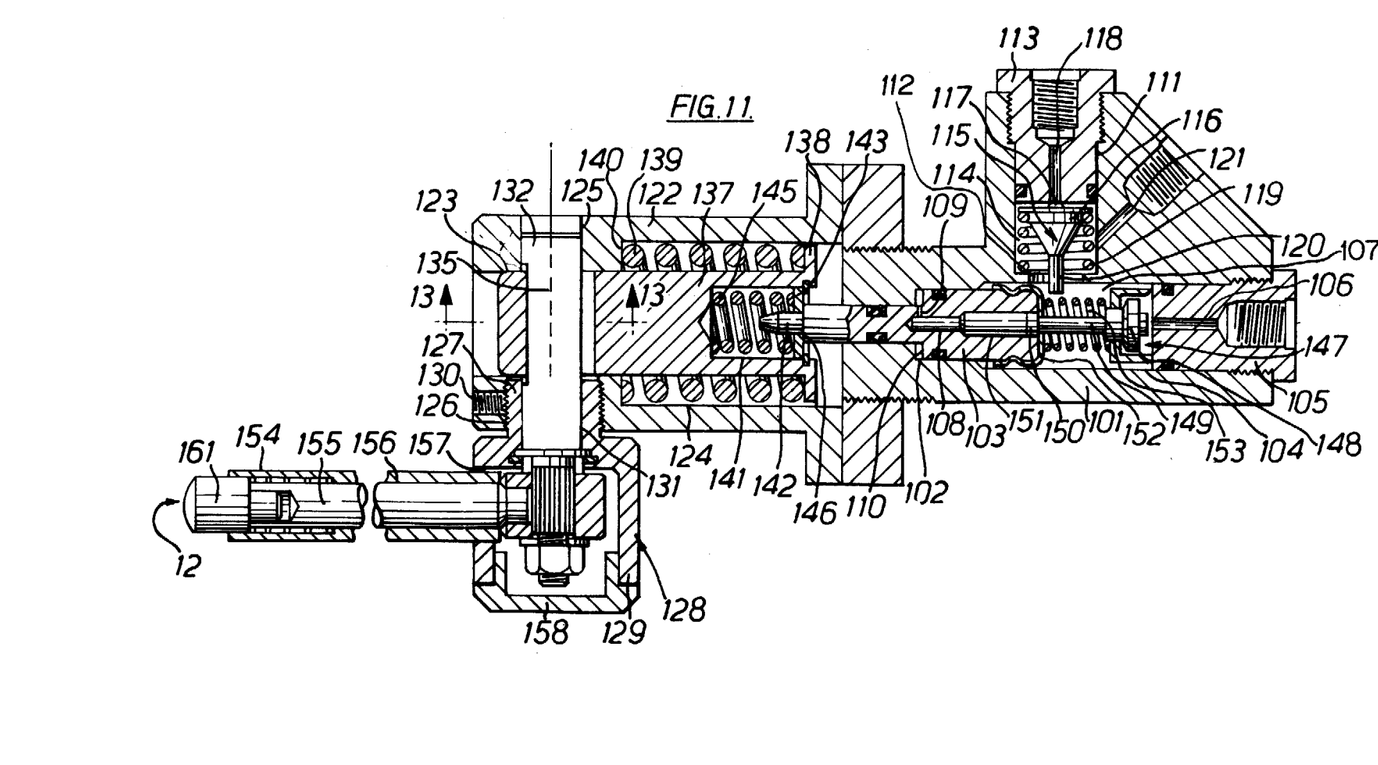
FIG. 11 is a longitudinal section through a manually-operable brake applying mechanism incorporating an hydraulic control valve.
Figure 12:
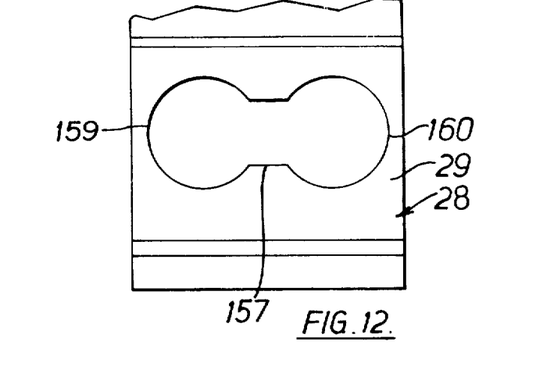
FIG. 12 is a view on FIG. 11 in the direction of the arrow 12.

A radial recess 111 in the wall of the housing 101 is in communication with the pressure space 107 through a radial port 112. A union 113 for connection to a source of hydraulic fluid under pressure, for example an hydraulic accumulator or high pressure pump, is screwed into the outer end of the recess 111. A chamber 114 defined between the inner end of the union 113 and the radial port 112 houses a tilting valve member 115 of which a head 116 is normally urged into engagement with a seating 117 surrounding an axial passage 18 in the union 113 by means of a compression spring 119. The head 116 is carried by a stem 120 which projects into the counterbore 104 through the port 112 and into the path of the piston 103. The adjacent end of the pistion 103 is normally spaced from the stem 120 so that the tilting valve mbmer 115 is normally in the closed position.

A passage 121 in the wall of the housing 101 for connection to brake applying means communicates at its inner end with the chamber 114.

The brake applying means are adapted to apply a brake for emergency or parking purposes. The brake applying means may be of any convenient known construction, for example of the spring actuated type, in which a spring is utilised to apply the brake and is either released or compressed by the application thereto of hydraulic pressure from the chamber 114 in the application of the brake.

A housing 122 is attached to the end of the housing 101 from which the portion of the differential pistion 103 is of smaller diameter projects. The housing 122 is provided with a longitudinally extending through bore 123 which is co-axial with the stepped bore 102 and which is counterbored at 124 from its end adjacent to the housing 101.

The housing 122 is provided, adjacent to its outer end, with a pair of axially aligned traverse bores 125 and 126 which are of different diameters. The bore 126 is of greater diameter and receives a threaded spigot portion 127 of reduced diameter at the closed end of a fitting 128 of substantially cupshaped outline having an annular skirt 129. The fitting 128 is clamped against rotation relative to the housing 122 by means of a clamping screw 130.

Figure 13:
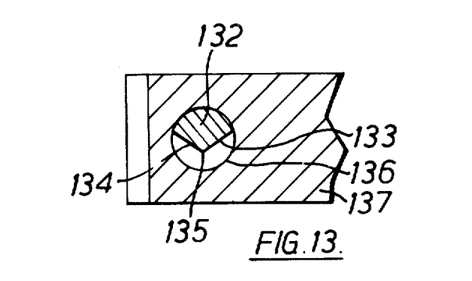
FIG. 13 is a section on the line 13—13 of FIG. 11.
Figure 14:
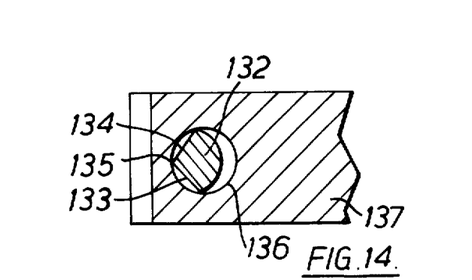
FIG. 14 is a section similar to FIG. 13 but showing the brake applying mechanism in an operative position.

The closed end of the fitting 128 and the spigot part 127 are formed with a bore 131 which is aligned axially with, and is of the same diameter as, the bore 125, and a shaft 132 is journalled for rotation in the bores 125 and 131. The effective diameter of an intermediate portion in the length of the shaft 132 extending at least between diametrically opposed parts of the bore 123 is reduced by machining on the shaft a pair of flats 133 and 134 which intersect at a point 135 spaced radially inwards from the outer surface of the shaft as shown in FIGS. 13 and 14.

The shaft 132 extends through a circular opening 136 in a thrust piston 137 which works in the bore 123 and the intermediate portion of the shaft 132 provided with the flats 133 and 134 is located wholly within the opening 136 which is of a diameter slightly greater than that of the shaft 132.

The inner end of the thrust piston 137, which is normally spaced from the adjacent end of the housing 101, carries a radial flange 138 working in the counterbore 124. The flange 138 forms an abutment for one end of a compression spring 139 of which the outer end engages with a shoulder 140 at the step is diameter between the bore 123 and the counterbore 124. When the shaft 132 is in the position shown in FIG. 13 of the drawings, the full diameter of the intermediate piston engages with the opening 136 to hold the thrust piston 137 in a retracted position in which the compression spring 139 is compressed.

The free end of the stepped piston 103 which is of smaller diameter is received in an axial recess 141 in the adjacent end of the piston 137. A reduced diameter portion 142 at that end of the piston 103 extends through a central opening in a platae 143 which is normally urged against a stop 144 at the outer end of the recess 141 by means of a compression spring 145. A shoulder 146 at the step in diameter between the portion 142 and the portion of the stepped piston 103 which is smaller diameter abuts against the plate 143.

In this position a valve assembly 147 for controlling communication between the pressure space 107 and the axial exhaust port 106 is held in an open retracted position. The valve assembly 147 comprises a head 148 for engagement with a seating on the inner end of the plug 105 surrounding the port 106. The head 148 is carried by a stem 149 having on its opposite end a head 150 working in a counterbore 151 in the adjacent end of the bore 108. The head 150 is retained in the counterbore 151 by a cup-shaped ferrule 152 which is crimped around the piston 103. Normally the head 150 is held in engagement with the ferrule 152 by means of a compression spring 153 acting between the head 148 and the ferrule 152.

To apply the brake the shaft 132 is rotated in the housing 122. This may be achieved by any convenient means. However, as illustrated in the drawings, the shaft rotating means comprise a hand brake applying lever assembly comprising an inner rod 155 contained within an outer tube 156. The rod 155 extends into the fitting 128 through a circumferentially extending elongated opening 157 and is splined to an extension 158 of the shaft 132. The opening 157 is formed at opposite ends with enlarged portions 159 and 160 of which the effective diameters are each slightly greater than the external diameter of the outer tube 156. In the position shown in FIG. 13 of the drawings the inner end of the tube 156 is received within the portion 160 which holds the mechanism in a released position. When a spring-loaded button 161 acting between the rod 155 and the tube 156 is de-pressed, the tube is withdrawn from its engagement in the opening portion 150, and thereafter, the lever assembly 154 can be moved angularly in a brake applying direction to rotate the shaft 132.

Rotation of the shaft 132 moves the flats 133 and 134 into the position shown in FIG. 14 to decrease the effective diameters of the shaft acting on the wall of the opening 136 and provide a clearance between the point 135 and the opening 136. This clearance is taken up by the effect of the compression spring 139 which advances the thrust piston 137 in the bore 123. That movement is transmitted to the differential piston 103 which is thereby advanced in the counterbore 104 to cause the valve head 148 to engage with its seating and cut-off communication between the pressure space 107 and the reservoir. Thereafter, the valve head 116 tilts about its engagement with the union 113 due to the engagement of the piston 103 with its stem 120. Thus high pressure fluid is admitted to the pressure space 107 and is delivered to the brake applying means through the outlet passage 121, thereby applying the emergency or parking brake.

When the brake is applied fully the free end of the tube 156 is received within the portion 159 at the opposite end of the circumferential slots.

To release the emergency or parking brake the lever assembly 154 is moved angularly in the opposite direction and the components of the mechanism return to the positions shown in the drawings due to the influence of the return springs 145 and 153.

A typical hydraulic braking system incorporating a manually-operated brake applying mechanism as described above is illustrated in FIG. 15 of the accompanying drawings.

Figure 15:
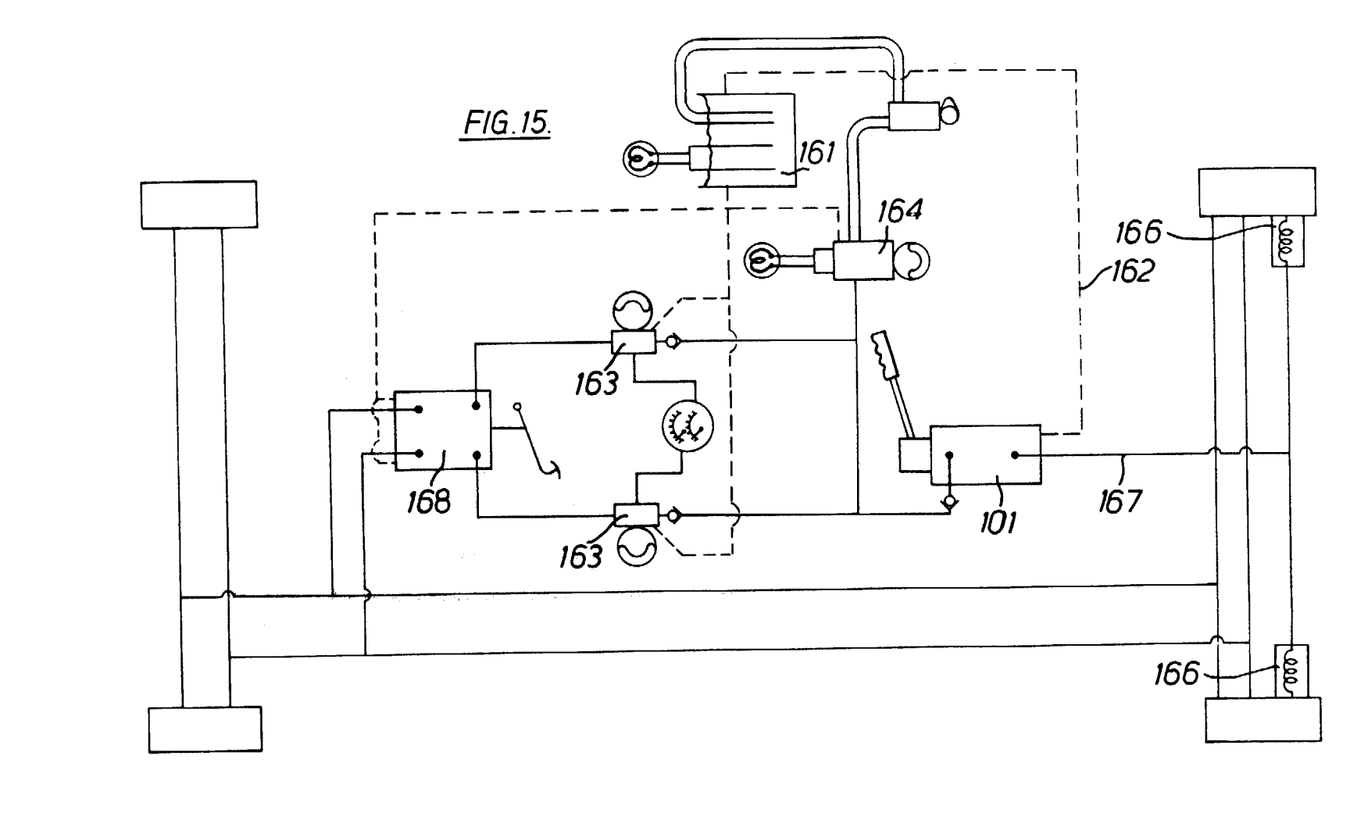
FIG. 15 is a layout of a typical braking system incorporating the brake applying mechanism illustrated in FIGS. 11–14.

As illustrated in FIG. 15 the mechanism 101 is connected to a reservoir for fluid 161 through a pipe line 162. Similarly a pair of hydraulic accumulators 163, which are supplied with fluid under pressure from a pump 164 fed from the reservoir 161, are connected in parallel to the mechanism 101 through a pipe-line 165. The actuators 166 of the rear wheel brakes are connected to the mechanism 101 through a pipe-line 167.

Fluid under pressure from the hydraulic accumulators 16 is also supplied to actuators of the brakes on the front and rear wheels of the vehicle through a pedal-operated control valve 168 connected in parallel with the accumulator.

I claim:

1. A manually-operable brake applying mechanism for vehicles comprising a housing having a bore, a piston working in said bore and movable between an inoperative retracted position and an operative advanced position, resilient means for urging said piston into said inoperative retracted position, said housing also having an inlet port for connection to a source of hydraulic fluid under pressure and an outlet port for connection to brake applying means, valve means for controlling communication between said inlet port and said outlet port and movable between an open position and a closed position, resilient means to urge said valve means into said closed position when said piston is in said inoperative retracted positon, an operative engagement between said piston and said valve means to urge said valve means into said open position when said piston is moved from said inoperative retracted position into said operative advanced position, and mechanical operating means for urging said piston from said inoperative retracted position into said operative advanced position, wherein said mechanical operating means comprises a thrust member for engagement with said piston and having a transverse bore, a transverse shaft projecting through said transverse bore and journalled for rotation in said housing, said shaft having an intermediate portion rotatable within said transverse borer and which is provided with a pair of flats which intersect at a point spaced from a diametrically opposite point on said shaft by a distance less than the diameter of said transverse bore, said thrust member being movable with respect to said housing upon rotation of said transverse shaft between a first position in which the effective diameter of said shaft is at a maximum and a second position in which the effective diameter of said shaft is at a minimum, and an angularly movable applying member for rotating said shaft between said first and second positions.

2. A manually operable brake applying mechanism as claimed in claim 1 wherein said housing incorporates an exhaust port for connection to a reservoir for fluid and communicating with said bore, and a valve for controlling communication between said bore and said exhaust port is normally open but is closed when said piston is moved between said inoperative retracted position and said operative advanced position before said valve means is opened.

3. A manually-operable brake applying mechanism as claimed in claim 1, wherein said thrust member works in a bore axially aligned with said piston, a lost-motion connection is incorporated through which said thrust member acts on said piston, and a compression spring acts between said housing and said thrust member to urge said thrust member towards said piston at all times and to maintain said thrust member in engagement with said intermediate portion of said transverse shaft.

* * * * *